US010860860B1

(12) United States Patent
Huynh et al.

(10) Patent No.: US 10,860,860 B1
(45) Date of Patent: Dec. 8, 2020

(54) MATCHING VIDEOS TO TITLES USING ARTIFICIAL INTELLIGENCE

(71) Applicant: Amazon Technologies, Inc., Seattle, WA (US)

(72) Inventors: Steve Huynh, Seattle, WA (US); Paul Martin, Seattle, WA (US); Michael Bartholomew, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 49 days.

(21) Appl. No.: 16/239,316

(22) Filed: Jan. 3, 2019

(51) Int. Cl.
| | | |
|---|---|---|
| G06K 9/00 | (2006.01) |
| H04N 21/234 | (2011.01) |
| G06N 3/04 | (2006.01) |
| G06N 3/08 | (2006.01) |
| H04N 21/25 | (2011.01) |

(52) U.S. Cl.
CPC ....... G06K 9/00718 (2013.01); G06N 3/0454 (2013.01); G06N 3/08 (2013.01); H04N 21/23418 (2013.01); H04N 21/251 (2013.01)

(58) Field of Classification Search
CPC .......... G06F 16/73; G06F 16/78; G06F 16/00; G06F 16/71; G06F 16/75; G06F 16/783; G06F 16/7867; G06F 40/30; G06F 16/43; G06F 16/35; G06F 16/353; G06F 16/70; G06K 9/00718; G06K 9/00744; G06K 9/6256; G06K 9/00751; G06K 9/52; G06K 9/6201; G06K 9/627; G06K 9/00281; G06K 9/00335; G06K 9/3233; G06N 20/00; G06N 3/0454; G06N 3/08; G06N 3/084; G06N 3/088; G06N 5/022; G06N 5/02; G06T 2207/20084; G06T 17/00; G06T 2200/08; G11B 27/34; G11B 27/031; G11B 27/10; H04N 21/233; H04N 21/23418; H04N 21/4394; H04N 21/44008; H04N 21/44029; H04N 21/8549; H04N 5/265; G06Q 30/0643; A61B 5/165; A61B 5/7267
USPC ........... 382/105, 124, 125, 126, 159; 706/12
See application file for complete search history.

(56) References Cited

U.S. PATENT DOCUMENTS

| | | | |
|---|---|---|---|
| 5,884,004 A * | 3/1999 | Sato ................... | H04N 21/8541 386/337 |
| 9,280,742 B1 * | 3/2016 | Sargin ...................... | G06N 5/04 |
| 10,576,380 B1 * | 3/2020 | Beltran ................... | A63F 13/67 |
| 2006/0088806 A1 * | 4/2006 | Quinn ...................... | G09B 7/02 434/236 |

(Continued)

*Primary Examiner* — Aklilu K Woldemariam
(74) *Attorney, Agent, or Firm* — Kilpatrick Townsend & Stockton LLP

(57) ABSTRACT

Computer systems of a multimedia service provider may utilize an artificial intelligence model to automatically match a video content with an existing video title of a catalog, allowing the provider to efficiently and accurately process a high volume of video content being received. The artificial intelligence model may be proceed by analyzing video frames from the video content to extract features and then determining the relevance of a set of features to a particular video title of the catalog. Based on the relevance determination, the computer system may associate the video content with the particular video title. In cases where no match with an existing title is determined, the artificial intelligence model may create a new video title based in part on the extracted features.

20 Claims, 11 Drawing Sheets

(56) References Cited

U.S. PATENT DOCUMENTS

| | | | |
|---|---|---|---|
| 2011/0218948 A1* | 9/2011 | De Souza | G06N 5/02 706/12 |
| 2014/0294262 A1* | 10/2014 | Schuckers | G06K 9/00073 382/125 |
| 2015/0081604 A1* | 3/2015 | Duque | G06F 16/70 706/12 |
| 2015/0324459 A1* | 11/2015 | Chhichhia | G06F 16/93 706/12 |
| 2016/0004911 A1* | 1/2016 | Cheng | H04N 21/44008 382/159 |
| 2016/0132600 A1* | 5/2016 | Woodhead | G06F 16/7837 707/754 |
| 2018/0025079 A1* | 1/2018 | Xiao | G06F 16/739 707/722 |
| 2018/0025228 A1* | 1/2018 | Varadarajan | G06K 9/6201 382/159 |
| 2018/0121953 A1* | 5/2018 | Zhang | G06N 5/003 |
| 2019/0163977 A1* | 5/2019 | Chen | G06K 9/6262 |
| 2019/0179938 A1* | 6/2019 | Feuz | G06F 9/542 |
| 2019/0258671 A1* | 8/2019 | Bou | G06K 9/00751 |
| 2020/0012862 A1* | 1/2020 | Mitra | G06N 20/00 |

* cited by examiner

MATCHING VIDEOS TO TITLES USING ARTIFICIAL INTELLIGENCE

BACKGROUND

Multimedia services provide different functionalities to end users. In a variety of fields, ranging from news and politics to sports and entertainment, customers are increasingly able to watch fresh video content on their computing devices on-demand. Additionally, with the rise of cloud computing and ease of access to the Internet, there has been a dramatic increase in the amount of video content being published online on a daily basis. However, content providers that publish video content online deal with significant hurdles to publishing accurate content in a timely fashion. For example, content providers often receive video content from a variety of partner providers, and each partner provider often provides video content in a different format, with different types and amounts of metadata provided with each video content that allow for proper cataloging of the video. When metadata is provided, it is often input by humans, making it error-prone and not reliable for cataloging the video content.

Another problem is that content providers are under increasing pressure to publish fresh video content in a timely fashion that customers can easily and quickly access on their computing device. The video content often has a short shelf-life, and the value to the customer decreases substantially over time. For example, few people want to read yesterday's news. Conversely, most people want to view a highlight video of today's NFL football game as soon as possible.

Some content providers have attempted to address these problems by adding more human staff to process and catalog incoming videos by partner providers. However, this solution has several disadvantages. First, as partner providers demand an increasing amount of video content to be published every day, it is difficult to scale up human staff to meet the demand. Second, especially under time pressure, human staff are just as prone to make errors in cataloging incoming videos as were the partner providers that provided the videos with faulty metadata. There is therefore a need to improve the process of matching a video content with a video title of a video catalog.

BRIEF DESCRIPTION OF THE DRAWINGS

Various embodiments in accordance with the present disclosure will be described with reference to the drawings, in which.

DETAILED DESCRIPTION

Figure 1:
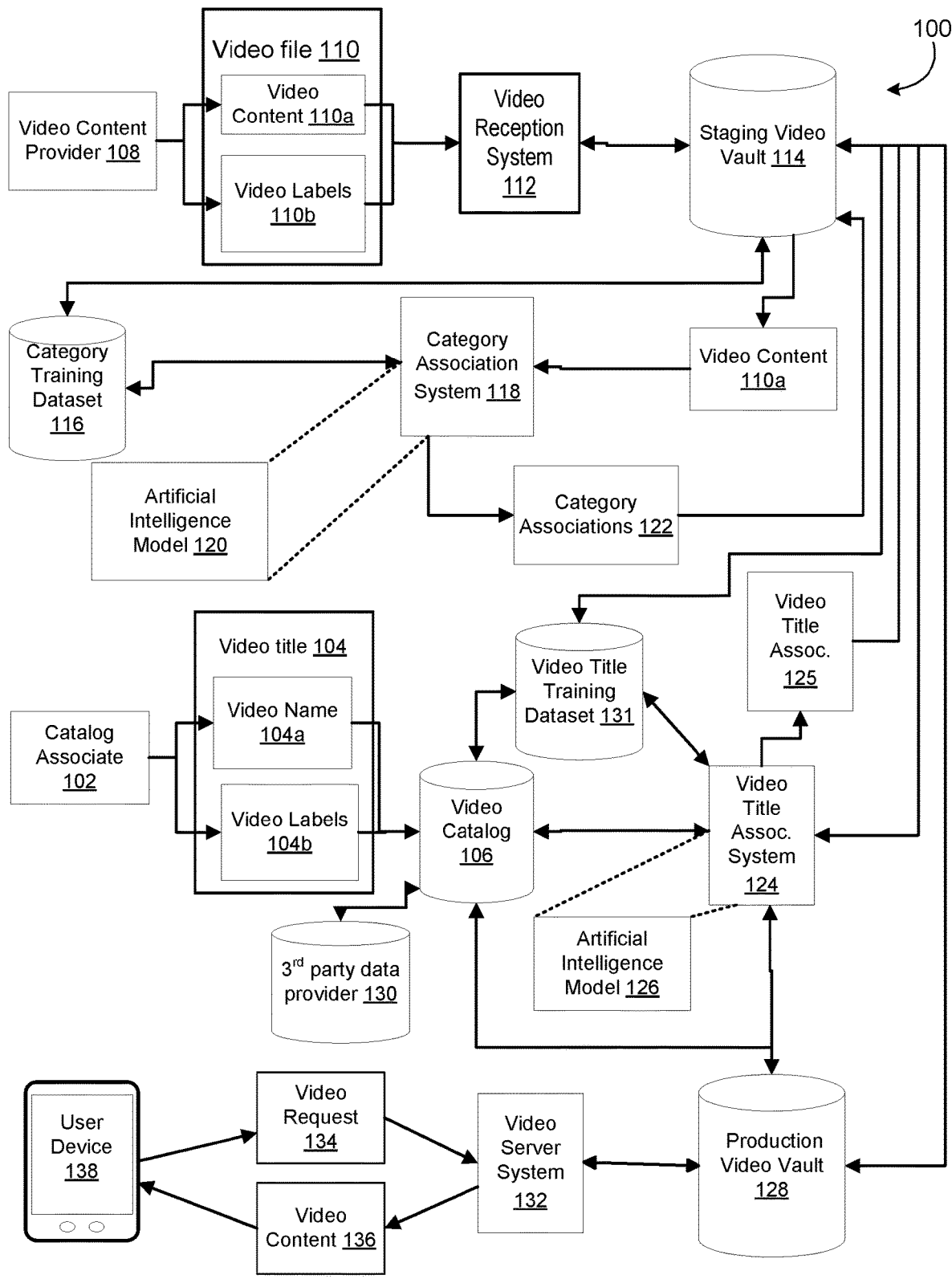
FIG. 1 illustrates an example computing environment for providing a multimedia service based on an artificial intelligence model, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a multimedia service that provides video content, where the video content is matched with an item entry in a video catalog, for example, the entry including a title of the video. The matching between the video content and the catalog entry is based at least in part on an artificial intelligence model. In at least one embodiment, a video catalog associate person may input into the catalog a video title and other details of the entry (e.g., "2018 Wimbledon Championships—Women's Singles Highlights—Angelique Kerber v. Serena Williams") that corresponds to a video content (e.g., 2018 Wimbledon Championships—Women's Singles tournament highlights). In another embodiment, a video catalog associate person may not know in advance who the players in the tournament are, and instead may input a catalog entry template (e.g., "2018 Wimbledon Championships—Women's Singles Highlights—X v. Y"), where the players' names may be subsequently identified once the qualifying matches are completed. Subsequent to the video title being input into the video catalog, a partner video provider may send a video content file to the multimedia service provider, which corresponds to the video title previously input into the catalog. The artificial intelligence model may be used to match the video title with the video content, which may then be published online for access by a customer of the multimedia service provider. In some embodiments, the artificial intelligence model may be used to match a template video title with the video content. A new catalog entry video title may be created from the template video title, in part based on the inference of the artificial intelligence model (e.g., continuing with the example above, populating the title with players' names based on facial recognition of the players' faces).

In at least one embodiment, the artificial intelligence model may include at least two sub-models (i.e. "first artificial intelligence model" and "second artificial intelligence model"). In at least one embodiment, the first artificial intelligence model incorporates an image recognition system (e.g., utilizing a neural network) and may be trained to receive video file content from a partner video provider and identify and classify portions of the video file content into different categories. Each of the categories may correspond to a particular feature of the video that can be used to match the video content with a video title from a video catalog. To illustrate, a video file may contain content from a sporting event that was recently broadcasted (e.g., a championship tennis match). In some examples, the video content may contain images that allow recognition of the players, the location where the event was played, the approximate time of day the event was played, a specific event within the sporting event (e.g., an ace serve), the jersey numbers of the players, and the like. The first artificial intelligence model may be trained to allow recognition of categories that correspond to features from these images, including "location," "time of day," "players," and the like. The first artificial intelligence model may also be trained to recognize sub-categories within categories. For example, it may recognize not only the human players in the images, but also be trained to recognize the faces of the individual players, and even the identity of the each player (e.g., "Serena Williams"). Once trained, the first artificial intelligence model may infer a list of categories that correspond to each frame.

In at least one embodiment, the second artificial intelligence model (e.g., a neural network) may receive from the first artificial intelligence model the inferences comprising the list of categories corresponding to the video content provided by a partner video provider. The second artificial intelligence model may be trained to match the categories corresponding to the video content with the corresponding video title of the video catalog. For example, the categories may include players' names, the location where the event happened, and the like. The video titles of the video catalog may include multiple titles (e.g., placeholders titles for highlights of the various Wimbledon matches for a specific tournament). In at least one embodiment, the second artificial intelligence model may be trained to infer one or more value tuples, each tuple corresponding to a candidate video title, and containing at least an identifying key of the video title and a probability value that corresponds to the likelihood that the particular video title is an accurate match. In another embodiment, depending on whether the probability value matches or exceeds a preset threshold value (indicating a minimum confidence level needed to confirm a valid match), the multimedia service may update the video catalog by associating the video content input to the first artificial intelligence model with the selected video title candidate that was inferred by the second artificial intelligence model. In some embodiments, the multimedia service may then publish the video content and the associated video title to a production video vault. A customer of the multimedia service provider may then use their computing device search for a particular video title and request the video content corresponding to that title, whereby a video server of the multimedia service provider may provide the video content to the customer's computing device.

The embodiments of the present disclosure may provide many technical improvements over existing systems. Generally, existing systems may rely on manual or automated processes match video content with video titles of a video catalog. As described above manual processes may be tedious, error prone, and may not properly scale up to support a large catalog of video titles, nor scale up to process a large number of new video content files regularly being received. Existing automated processes may not be accurate.

For example, an existing automated process may require that video content metadata be received from a partner provider, which corresponds to the video content file that is sent by the partner content provider. The automated process may attempt to match the video content metadata with an existing video title of a video title catalog. However, often partner content providers may not upload any metadata with the corresponding video content file. Other times, metadata that is sent may have errors (e.g., a misspelled label), or be sent in a different format than is expected by the automated process. This may cause the automated process to incorrectly ignore a matching video title (i.e. false negative), or to incorrectly match video content with a non-matching video title (i.e. false positive). Furthermore, the automatic process may need to be continuously updated to deal with changing metadata formats.

In contrast, the embodiments of the present disclosure provide an automated process that can be properly scaled and that can provide accurate results. In particular, the automated process may be performed by an artificial intelligence model, which may include several submodels. In a first submodel, which receives video content as input, and is trained to infer corresponding categories, the training dataset may include a large and diverse set of video content and training labels identifying the different categories at a frame level. The first submodel may itself include different submodels (e.g., a plurality of neural networks). For example, one neural network may learn inherent features and generate vector representations at the frame level, and another neural network may be trained to map vector representations into categories. A second submodel (e.g., a neural network) may receive categories corresponding to a video content as input, and may infer a matching video title. Although the embodiments describe herein use neural networks as examples of submodels, this is only for illustration purposes. It should be understood that the one or more artificial intelligence models may utilize any suitable computer-implemented artificial intelligence technique, as discussed in more detail below.

In some embodiments, the present disclosure may not only allow for matching video content with video titles, but also may provide a mechanism for a multimedia service provider to sort from a set of videos that are received. In one example, a service provider receives multiple highlight videos of tennis matches for a particular tournament. A highlight video may be a video content that contains highlights of one or more notable events. For example, in a tennis match, a highlight video may contain highlights including an ace serve, an unusually long point, the last point in a tie-breaker, etc. However, each video received from a partner provider may have a generic label (e.g., "UNTITLED.mp4") and it may be difficult to determine which highlight videos customers would be most likely to request, and therefore the service provider may not know which videos to make most visible on their website. Through the present disclosure, the service provider may determine, for example, who are the players in each video, and therefore be able to promote those videos that contain players of a higher ranking.

In the interest of clarity of explanation, the embodiments of the present disclosure are described in connection with a video content file that includes a plurality of frames, and is associated with zero or more labels of metadata. The video content file may be associated with a particular video title, the video title belonging to a catalog of video titles. For such a type of video content file, categories may be defined, which correspond to identifying features of the video content file. However, the embodiments are not limited as such.

Instead, the embodiments may similarly apply to any content, including video, audio, text, and/or other content types. Each content type may be associated with a title of a catalog. Furthermore, each feature of the content may be categorized in a category, where the different categories may correspond to the particular title of the catalog.

FIG. 1 illustrates an example computing environment for providing a multimedia service based on an artificial intelligence model, according to an embodiment of the present disclosure. As discussed above, although multiple artificial intelligence models are illustrated, this is only for the purpose of illustration, and the computing environment can be enabled by a single artificial intelligence model. As used herein, the term "artificial intelligence" refers to any suitable computer-implemented artificial intelligence technique including machine learning (supervised or unsupervised), natural language processing, machine perception, computer vision, affective computing, statistical learning and classification (including use of hidden Markov models, Bayesian network models and Kalman filters), reinforcement learning including neural networks, search algorithms and optimization algorithms (including evolutionary computing) and automated reasoning. Furthermore, although multiple computer systems and data store instances are illustrated, this is only for the purpose of illustration, and the computing environment can be enabled by a single computer system and/or data store. As used herein, the term "data store" refers to any device or combination of devices capable of storing, accessing, and/or retrieving data, which may include any combination and number of data servers, databases, data storage devices, and data storage media, in any standard, distributed, or clustered environment. In some embodiments, a data store may be housed within a computer system, or any other suitable variation.

In an example, the multimedia service may support a video on-demand service that enables an end user to download or stream video content. As illustrated, the computing environment may include one or more computer systems of the service provider and a user device 138. In some embodiments, a catalog associate 102 of the service provider may input an entry into a video catalog 106, the entry comprising a video title 104. In some embodiments, the video title 104 may include a video name 104*a* and one or more labels 104*b* that may be used to identify the video title 104. For example, in the case of video highlights for the 2018 Wimbledon Championships for Women's Singles match, the video title 104 may include a single string name (e.g., "2018 Wimbledon Championships for Women's Singles Highlights"). Alternatively, the video title 104 may include multiple labels, of which one or more of the labels, together, may include a key used to associate the video title with video content. For example, in some embodiments, the video title may include a video label 104*b* of "12 PM-4 PM," which may indicate a time range of when the corresponding video file 110 is expected to be received. In other embodiments, a video label may indicate an expected duration of a video title (e.g., "5 minutes"). The system may utilize one or more of these video labels 104*b* to assist in determining whether a received video content 108 matches a particular video title or video title template. In some embodiments, the video catalog 106 may be a data store which stores video titles 104. In some embodiments, the video catalog 106 may supplement the video title 104 with additional labels 104*b* generated automatically. For example, the video catalog 106 may associate the video title 104 with a timestamp indicating when the entry in the video catalog was created.

Figure 2:
FIG. 2 illustrates manually input video content metadata, according to an embodiment of the present disclosure.

In some embodiments, subsequent to the catalog associate 102 inputting the video title 104 into the video catalog 106, a video reception computer system 112 may receive a video file 110 from a partner video provider 108, the video file 110 being intended to match the video title 104. In other embodiments, the video file 110 may be input prior to (or at approximately the same time) the inputting of the video title 104. The partner video content provider 108 may be another online video provider, TV broadcast company, news organization, sports league, and the like. In some embodiments, the video content provider 108 may also be an individual who uploads personal videos online for publication. In some embodiments, the video file 110 may include video content 110*a* and zero or more video labels 110*b*. The video content 110*a* may include a plurality of frames, and the video labels 110*b* (also known as "video content metadata" or "video metadata"). In some embodiments, the video metadata may be computer generated, for example, including association information that identifies timestamps and/or frames in the video content. The video content 110*a* may be delivered in a variety of formats, including, but not limited to, AVI, FLV, WMV, MOV, and MP4. In other embodiments, the video metadata 110*b* be input by a video content provider 108. This input video metadata 110*b* may be used to help identify the video content 110*a*. In some embodiments, the manually input video metadata may be used to construct a string that is used as the filename for the video file (e.g., "2018 Wimbledon Championships Women Singles Highlights.mp4"). As illustrated in FIG. 2, a provider may use a software application to create the filename with the metadata embedded within the filename. Alternatively, a provider may directly edit the filename using functionality provided by their operating system. In other embodiments, there may be no manually input video metadata. In such cases, the video file name may be a random or placeholder file name (e.g., "UNTITLED.mp4").

In some embodiments, the video reception computer system 112 may store the video file 110 in a staging video vault 114. The staging video vault 114 may be a data store that is communicably connected to the video reception computer system 112. In other embodiments, the video reception computer system 112 and the staging video vault 114 may be components of the same computer system. In yet other embodiments, the video file 110 may not be stored in a permanent storage (e.g., disk-based storage), but rather may be temporarily held in volatile memory (RAM-based memory).

In some embodiments, the category association computer system 118 may generate the category associations 122 based on an artificial intelligence model 120. This model 120 may be trained to identify and classify features from video frames into different categories. The training may rely on a training dataset 116 accessible to the category association computer system 118, the training dataset 116 being populated with training data from the staging video vault 114. This training dataset 116 may include a large and diverse set of video content of different lengths and genres. In a supervised training mode, the training dataset 116 may also include training labels that identify video frames and the corresponding categories associated with each frame. Such training labels can be used as the ground truth.

Upon completion of the training, the category association computer system 118 may receive as input a video file 110 (e.g., video content 110*a*) from the staging video vault 114 to the trained artificial intelligence model 120. In response, the trained artificial intelligence model 120 may infer category associations 122 from video frames of the video content 110a. For instance, the artificial intelligence model 120 may infer that the video file 110 portrays a tennis match as a video feature. It may further infer another video feature as being "Serena Williams," one of the participants in the tennis match.

The category inferences (i.e. also known as "category associations") 122 may be stored in a data store, for example, the staging video vault 114 where the video content file 110 was stored. For instance and continuing with the preceding example, the staging video vault 114 may store multiple key-value pairs. Each key may correspond to a timestamp or a frame of the video file. Each value may correspond to a corresponding category.

In some embodiments, the category association computer system 118, upon outputting the category associations 122 for the video file 110, may prompt a video title association computer system 124 to proceed to match the video file 110 with the video title 104, among the list of video titles of the video catalog 106. The video title association system 124 may proceed to retrieve the category associations 122 corresponding to the video file 110 from the staging video vault 114, and input the category associations 122 into an artificial intelligence model 126, as discussed in detail below.

In some embodiments, the video title association system 124, upon receiving a notification that a new video title 104 has been received into the video catalog 106, may contact the staging video vault 114 to determine if any new video files 110 have been recently received. If, for example, video file 110 contains video labels 110b that allow the video title association system 124 to immediately match the video file 110 with video title 104, then the video title association system 124 may immediately perform that association without using an artificial intelligence model 126, and store that association in the staging video vault 114. In such case, the video title association system 124 may contact a production video vault 128 and communicate that a new video file 110-to-video title 104 match has been created. The production video vault 128 may then contact the staging video vault 114 and retrieve the video file 110 from the staging video vault 114, along with the corresponding video title 104. The production video vault 128 may then publish the video content 110a online, with a corresponding title 104, so that customers can easily access the video content 110a. For clarity, the staging video vault 114 may include an environment that is similar or even identical to the production vault 128. For example, both the staging vault 114 and the production vault 128 may each include a data store that stores video files 110, video title associations 125 (discussed further below), and the like. However, the staging vault 114 is intended to provide an environment which allows the service provider to prepare the data (e.g., video content, video titles, etc.) to be accessible by a customer of the service provider. The production vault 128 stores the data in a form that is suitable to be accessed by a customer.

However, in the event that a match with the video title 104 cannot be immediately determined based on the video labels 110b, and continuing from the discussion above, the video title association system 124 may receive the category associations 122 that were output by the category association system 118, and input the category associations 122 into an artificial intelligence model 126. This model 126 may be trained to output video title inferences, the inferences comprising an association of one or more categories with one or more video titles 104 of the video catalog 106. The training may rely on a video title training dataset 131 accessible to the video title association computer system 124, the training dataset 131 being populated with training data from the video catalog 106. This training dataset 131 may include a large and diverse set of video titles of different lengths and genres. In a supervised training mode, the training dataset 131 may also include training labels that identify categories 122 associated with a video file 110 and the corresponding video title 104 associated with those categories 122. Such training labels can be used as the ground truth.

Upon completion of the training, the video title association computer system 124 may receive as input the category associations 122 from the staging video vault 114 to the trained artificial intelligence model 126. In response, the trained artificial intelligence model 126 may infer a probabilistic determination of an association between the video file 110 and the video title 104, based at least in part on the category associations 122 corresponding to the video file 110. For instance, the artificial intelligence model 126 may, based on category associations 122 associating "Serena Williams", "tennis match", and "Wimbledon tournament" with video content 110a, infer that the video content matches video title "2018 Wimbledon Championships Women Singles Highlights" with a certain probability. The video title association 125 may be stored in a data store, for example, the staging video vault 114 where the video content file 110 was stored. For instance and continuing with the preceding example, the staging video vault 114 may store a multiple key-value pairs. Each key may correspond to a video title 104. Each value may correspond to a corresponding video content 110a of a video file 110.

In some embodiments, the trained artificial intelligence model 126 of video title association system 124 may infer a plurality of candidate video titles that may match a particular set of category associations 122. For each candidate video title, the model 126 may infer an associated probability of valid match. In some embodiments, the video title association system 124 may be configured to determine if a valid match exists based on a predetermined threshold value. The threshold value (e.g., "95%") may indicate the minimum level of confidence needed by the system 124 to confirm a valid match and generate a video title association 125. In some embodiments, a candidate video title must either equal or exceed the threshold value to confirm a valid match.

In yet other embodiments, the system 124 may determine that no candidate video title meets a minimum threshold value. The system 124 may contact the video catalog 106 and indicate that there are no matching video titles 104. In such cases, the video catalog 106 may, in turn, communicate with a $3^{rd}$ party data provider 130 to retrieve new titles. For example, a video file 110 recently submitted to the staging video vault 114 by a movie studio may contain the contents of a movie (e.g., "Star Wars: Episode IX"). In the event of finding no valid match, the video catalog 106 may contact a movie database provider (e.g. IMDB), and download recent movie titles. The artificial intelligence model 126 of the system 124 may need to be further trained in order to infer a valid association between the video content 110a and the added video title 104. Note that it is possible that the new episode of Star Wars may contain new actors (e.g., Keri Russell, Matt Smith). In this case, the artificial intelligence model 120 may also need to be further trained to recognize new celebrity faces. Once an artificial intelligence model (e.g., 120, 126) is trained, it can then output new inferences based on the trained model.

In some embodiments, the video title association system 124 may adjust the probability value based on other data beyond category associations 122. For example, as mentioned above, the video title 104 may include a time range, which may indicate an approximate time the corresponding video file 110 is expected to be received. The system 124 may use this information and correlate with the timestamp of when the video file 110 was actually received. Other information may also be used to correlate a video file 110 with a video title 104, including, but not limited to, the expected length of the video, the language, the partner video provider's identity, video labels 110*b* associated with the video file 110, metadata embedded within the video content 110*a* (e.g, a video spliced into different portions (start credits, end credits, etc.) may generally correspond to a movie instead of a sports highlights), and the like. In some embodiments, these heuristics may be incorporated as part of the artificial intelligence model 126.

As discussed above, once the artificial intelligence model 126 of the video title association system 124 infers a video title association 125 (i.e. the probability value meets the required threshold value), the video title association system 124 may contact the production video vault 128 and communicate that a new video file 110-to-video title 104 association 125 has been created. The production video vault 128 may then contact the staging video vault 114 and retrieve the video file 110 from the staging video vault 114, along with the corresponding video title 104. The production video vault 128 may then publish the video content 110*a* online, with a corresponding title 104, so that customers can easily search for and access the video content 110*a*.

In some embodiments, once the video content 110*a* and corresponding video title 104 are published to the production video vault 128, the production vault 128 will communicate this to a video server computer system 132, which will cause the system 132 to make the content available online to customers. Upon a video request 134 from a user device 138, the system 132 may send the requested video content 110*a* from the production video vault 128 to the user device 138.

Although FIG. 1 describes a video on-demand service, the embodiments of the present disclosure are not limited as such. For example, the embodiments may similarly apply to a live content stream service (e.g., live video and/or audio streams). In particular, the user device 138 may receive live stream content from the video server system 132 (e.g., for a sports event). This live stream content may be a first stream of content available from a channel (e.g., sports audio and video available from a sports channel). The video reception system 112, upon receiving a live stream content, may cause the category association system 118 to input in real-time the live stream content to the trained artificial intelligence model 120 to also infer the relevant frame-to-category associations in real-time (real-time may refer to processing the content within an acceptable processing latency relative to the time the content becomes available). Following a similar process as described above, the trained artificial intelligence model 126 of video title association system 124 may infer title associations 125 in real-time, which may subsequently cause the title and matching video stream to be published on the production video vault. Upon a detection of a change in the first live stream content from a first category to a second category (e.g., over time, frames were associated with the first category, but then a number of the most recent frames became associated with the second category), a computer system of the computing environment 100 may provide one or more options to update the first live stream content. One example option may include updating the first stream to a second stream of content with a new title (e.g., indicating to the user on their user device 138 that an event has happened, such as a football touchdown was scored). The computer system may continue to input in real-time the first live stream content to the artificial intelligence model 120 to scan for new categories, and create a new title when a certain event is detected by means of category identification.

FIG. 2 illustrates an example user interface 200 for entering video content metadata 110*b* that is associated with video content 110*a*, according to an embodiment of the present disclosure. As mentioned above, in other embodiments, a partner provider 108 may directly enter video content metadata 110*b* by editing the video filename 110, using an operating system command. In the embodiment illustrated by FIG. 2, a video content provider 108 may utilize a computing device 201 to enter video content metadata 110*b* that is associated with video content 110*a*. In one exemplary embodiment, the video content provider 108 provides their identity 202 (e.g., "ESPN" 204), the stock keeping unit (SKU) 206 of the video content 110*a* (e.g., "Angelique Kerber v. Serena Williams"), and the content type 210. In this example, the content type 210 may be "Professional Tennis Highlights" 212. Accordingly, the provider may enter information about the tournament name 214 (e.g., "2018 Wimbeldon Championships" 216), tournament category 218 (e.g., "Women's Singles" 220), content quality 222 (e.g., "HD" 224), language 226 (e.g., "English" 228), and locale 230 (e.g., "en-US" 232). It should be understood that this is just one example of the types of video metadata 110*b* that may be input by a provider. In some embodiments, a provider 108 may not provide any metadata when submitting a video file to the service provider, in which case the video file name may be a random or placeholder file name (e.g., "UNTITLED.mp4"). In this case, the video title association system 124 may perform video title association based on the video content 110*a*. In other embodiments, the video content provider 108 may make a mistake when inputting metadata 110*b* (either via a user interface, or by directly editing the filename). For example, in the example embodiment, the user 108 mistakenly input "2018 Wimbeldon Championships" instead of "2018 Wimbledon Championships." In some embodiments, the fields 202-232 may have different orderings or formats, that vary between partner video providers. As discussed above, in some embodiments, the manually input video metadata may be used to construct a string that is used as the filename for the video file (e.g. "2018 Wimbeldon Championships Women Singles Highlights.mp4"). However, the video reception system's 112 ability to parse the metadata 110*b* in the filename may be dependent on the ordering and format of the metadata, and whether the metadata contains errors. The artificial intelligence models 120, 126, discussed in more detail below, improve the ability to match a video file 110 with a video title 104, especially when the available metadata (either interspersed within the video content 110*a*, or the corresponding video labels 110*b*) is sparse or incorrect.

Figure 3:
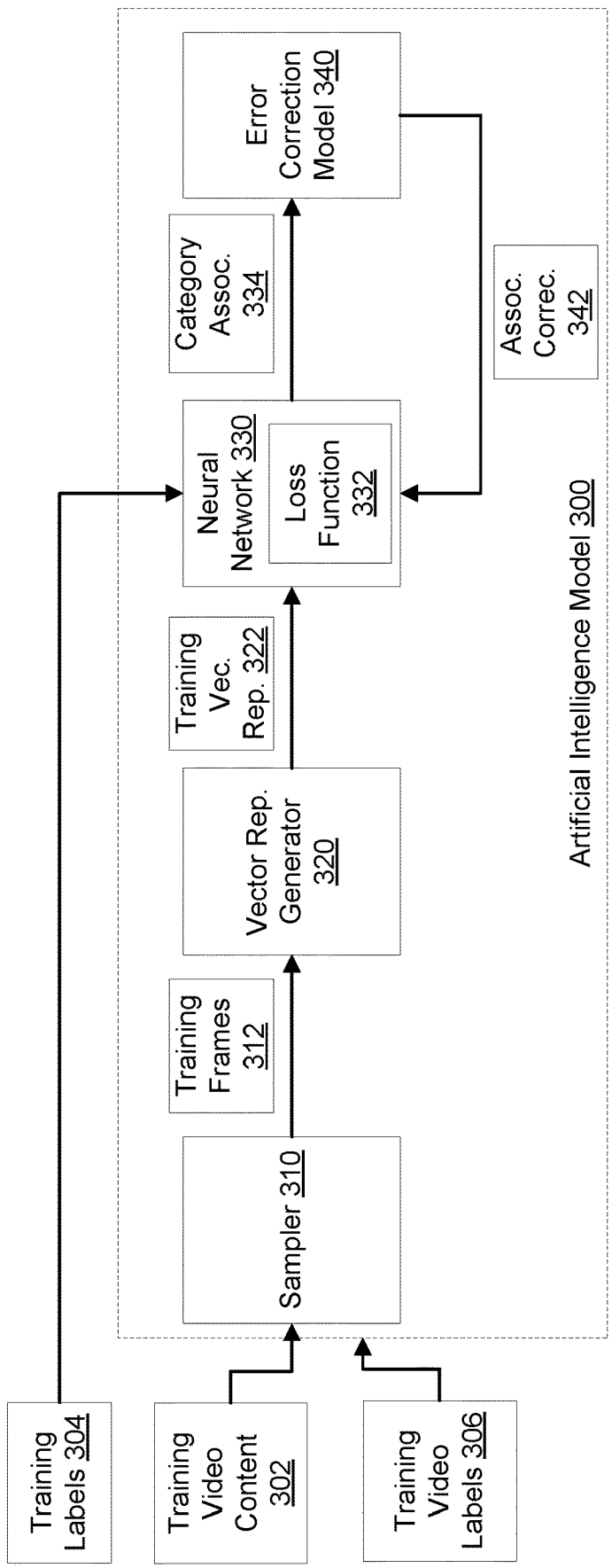
FIG. 3 illustrates an example computing environment for training an artificial intelligence model, according to an embodiment of the present disclosure.

FIG. 3 illustrates an example computing environment for training an artificial intelligence model 300 corresponding to the artificial intelligence model 120 of FIG. 1, according to an embodiment of the present disclosure. The training may rely on training video content 302 and training labels 304. The training video content 302 and training labels 304 may correspond to the training dataset 116 of FIG. 1. Although the artificial intelligence model 300 discussed below utilizes one or more neural networks in one embodiment, any suitable artificial intelligence model may be used, which is able learn to infer category associations from video content input. This includes, but is not limited to, decision tree learning, Bayesian statistics, classification algorithms, random forests, etc.

In an example, the artificial intelligence model 300 may include a sampler 310 and multiple video processing models, such as a vector representation generator 320, a neural network 330, and an error correction model 340. During the training phase, the training video content 302 and the training labels 304 may be input to the artificial intelligence model 120 to update and fine tune parameters of the neural network 330.

In particular, the training video content 302 may include multiple video contents (e.g., video files). Each video content may include a set of frames at a particular frame rate (e.g., twenty-four frames per second) and may be input to the sampler 310. In turn, the sampler 310 may select frames based on a sampling of the video content, where the sampling may be performed at a different frame rate (e.g., a lower frame rate of two frames per second). The selected frames may be output as training frames 312.

The training labels 304 of one training video content 302 may correspond to portions of this content. In particular, if the training video content 302 contains images of Serena Williams and Angelique Kerber, the training labels may identify that a particular set of selected training frames of the training video content 302 contain images of Serena Williams and Angelique Kerber. In some embodiments, the training labels may be used to train the model 300 to infer any suitable type of category. For example, this may include videos which contain categories that the service provider wants to exclude from being published (e.g., restricted copyright content, sexually explicit videos, etc.). The training labels may also include categories training a particular type of event (e.g., a football touchdown, an ace serve in a tennis match, a soccer goal, etc.). In other embodiments, the training labels may include other categories including recognition of text or audio from a video (e.g., scores from a game, current election voting results, stock ticker numbers, a particular person's voice, specific sequences of words spoken, etc.).

The training frames 312 may be input to the vector representation generator 320. In an example, this generator 320 may include a neural network already trained to detect objects in frames based on pixel properties, such as color, brightness, texture, and/or other properties. The vector representation generator 320 may output a training vector frame representation for each of the training frames 312. The training vector frame representation 322 may include features that are learned by the vector representation generator 320 based on pixel properties of the corresponding training frame. For instance, the training vector representation may be a vector of 4,096 features. The resulting training vector frame representations 322 may be organized as a time-series sequence (e.g., based on the original timing or sequence of the training frames in the corresponding training video content). This time-series sequence and the training labels 304 may be input to the neural network 330 that is under training.

The neural network 330 may be trained to associate a vector representation of a frame and a category. Each training label may be associated with a training frame and may identify the category to which the training frame belongs. Upon an analysis of a vector representation of the training frame, the neural network 330 may use the training label as ground truth.

In an example, the neural network 330 may be a recurrent neural network trained with a loss function 332. The loss function 332 may be defined based on an error of associating a training frame with an incorrect category, where the error may be based on the degree of inaccuracy. For example, the neural network 330, may correctly identify a frame as containing a human face as a category, but incorrectly determine that the face is of the "Serena Williams" category. Alternatively, the neural network 330 may incorrectly determine that a frame contains a picture of a ball instead of a human face, in which case the error may be larger. The loss function 332 may include an evaluation metric that may be adjusted based on the degree of error. For a larger degree of error, the penalty may be increased. Conversely, for a smaller degree of error, the penalty may be decreased.

The loss function 332 may also include an evaluation metric that can be adjusted based on feedback from the error correction model 340. As further described herein below, the error correction model 340 may correct associations between training vector representations (or, similarly, training frames) and the categories. The corrections may be fed back to the loss function 332 as a penalty.

The training of the neural network 330 may include iteratively minimizing the loss function 332 and updating parameters of the neural network 330 through backpropagation. The neural network 330 may infer category associations 334. These inferences may be provided as input to the error correction model 340 after each iteration, a number of iterations, or upon running the total number of iterations. A category association may correspond to a training vector representation that, in turn, corresponds to a training frame. The category association may associate the training vector representation (or, similarly, the training frame) with a category. In other words, the category association may indicate the predicted category of the training frame.

The error correction model 340 may detect errors in the category associations 334 and may correct some or all of the errors. Different types of errors may be detected and/or corrected including actual and potential errors, depending on the error correction techniques and contexts around the errors. Various techniques may be used by the error correction model 340, including, but not limited to, pattern recognition, rules, and/or heuristics. In one example, training video labels 306 may be used to train the error correction model 340. The labels 306 may correspond to sample metadata 110b that may be received by a video content provider 108. The labels 306 may help to generate heuristics that allow the error correction model 340 to correct category associations 334. For example, if a label contained metadata including the "Wimbledon" or "tennis" string, the error correction model 340 might correct category associations that contain "football" related categories.

In another example, category associations 334 may indicate that a sequence of training frames are associated with alternating or interposing categories. For instance, if training frame "N−1" and training frame "N+1" are associated with a "basketball" and training frame "N" is associated with a "volleyball", (where "N−1," "N," and "N+1" indicate the order of these frames), the error correction model 340 may detect an incorrect pattern of associations and, accordingly, declare an error (e.g., an actual error or a potential for an error). The error correction model 340 may also correct this error based on a majority rule. For instance, if the majority of the training frames preceding and/or following training frame "N" are associated with the "basketball" category, the error correction model 340 may change the category association of training frame "N" to the "basketball" category.

In an example, the error correction model 340 may output association corrections 342. An association correction may indicate that a category association 334 of a training frame 312 includes an error. The association correction may also include a correction to the category association 334. The association corrections 342 may be provided as feedback to the neural network 330 to update the loss function 332.

Figure 4:
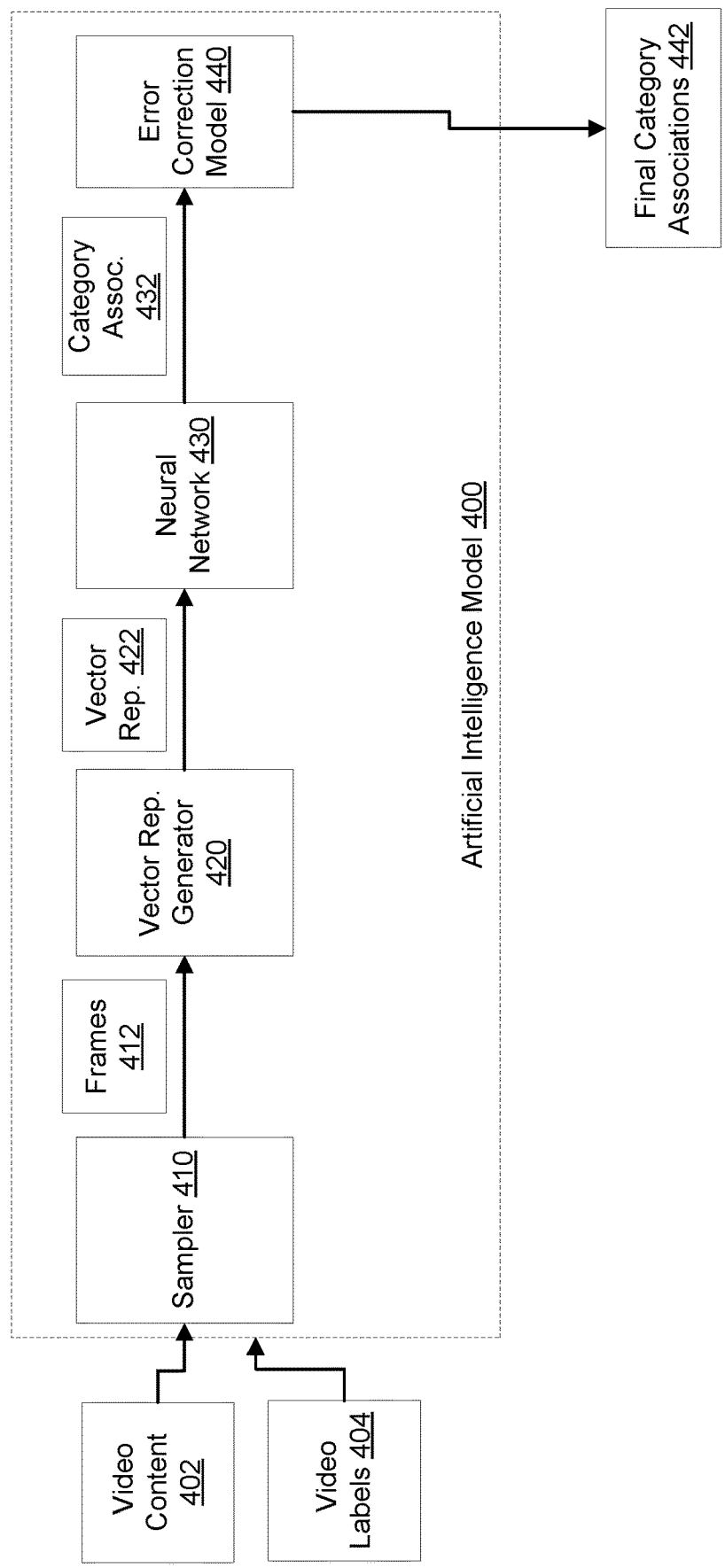
FIG. 4 illustrates an example computing environment for using a trained artificial intelligence model to infer category associations from portions of video content, according to an embodiment of the present disclosure.

FIG. 4 illustrates an example computing environment for using an artificial intelligence model 400 to infer category associations corresponding to video content, according to an embodiment of the present disclosure. The artificial intelligence model 400 may correspond to a trained version of the artificial intelligence model 300 of FIG. 3. In particular, the artificial intelligence model 400 may include a sampler 410 (that can be the same as the sampler 310), a vector representation generator 420 (that can be the same as the vector representation generator 320), a neural network 430 (that can be a trained version of the neural network 330), and an error correction model 440 (that can be the same as the error correction model 340).

Video content 402 (that may be the same as video content 110a from FIG. 1), such as a video file, may be provided as an input to the sampler 410. In response, the sampler 410 may select frames 412 based on a sampling of the video content at a particular frame (e.g., two frames per second, whereas the video content's frame rate may be twenty-four frames per second). The frames 412 may be input to the vector representation generator 420 as an ordered sequence (e.g., based on the order or timestamps of the frames 412).

The vector representation generator 420 may output vector frame representations 422 of these frames 412. Each vector frame representation may correspond to one of the frames 412 and the vector representations 422 may be organized as an ordered sequence (e.g., based on the order or timestamps of the frames 412). The sequence of the vector frame representations 422 may be input to the neural network 430.

The neural network 430 may infer category associations 432. Each category association may correspond to a vector frame representation that, in turn, corresponds to a frame. The category association may associate the vector frame representation and/or the frame with any suitable category (e.g., human face, time of day, location, sporting event, etc.). The category associations 432 may be input to the error correction model 440.

The error correction model 440 may output final category associations 342. In an example, the error correction model 440 may use pattern recognition to detect and correct errors in the category associations 432 (e.g., based on associations with early and late portions of video content and the respective timestamps, or based on heuristics from the video labels 404 (that may be the same as video labels 110b from FIG. 1) input to the model 400). Accordingly, the category associations 432 may be updated, resulting in the final category associations 442 (which may correspond to the category associations 122 of FIG. 1), some of which may be uncorrected category associations and other ones may be corrected category associations. A video title association system 124 may use the final category associations 442 as input to artificial intelligence model 126 of system 124, represented in FIG. 6 below.

Figure 5:
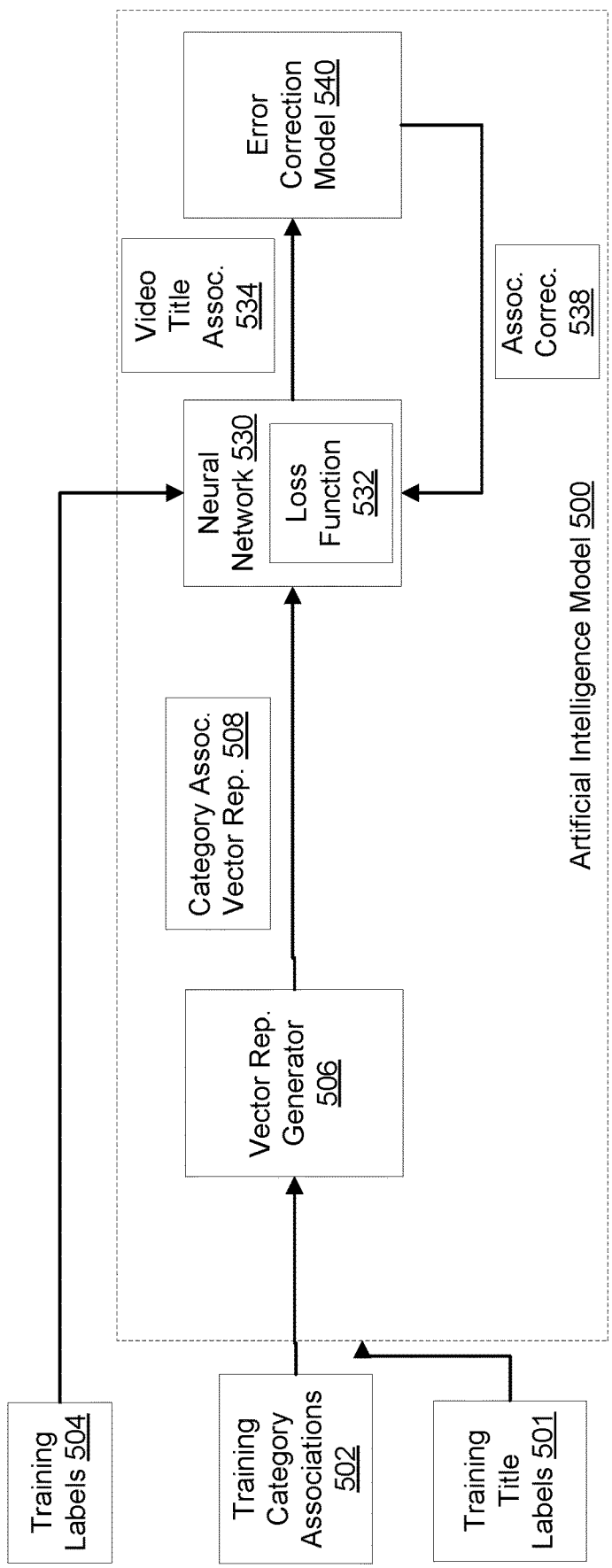
FIG. 5 illustrates an example computing environment for training an artificial intelligence model, according to an embodiment of the present disclosure.

FIG. 5 illustrates an example computing environment for training an artificial intelligence model 500 corresponding to the artificial intelligence model 126 of FIG. 1, according to an embodiment of the present disclosure. The training may rely on training category associations 502 and training labels 504. The training category associations 502 and training labels 504 may correspond to the training dataset 131 of FIG. 1, which may receive data from one or more data stores to populate the training dataset 131 (e.g., training category associations 502 from the staging video vault 114, training labels 504 from the video catalog 106). As discussed above, although the artificial intelligence model 500 discussed below utilizes one or more neural networks in one embodiment, any suitable artificial intelligence model may be used, which is able learn to video title associations from category associations.

In an example, the artificial intelligence model 500 may include a vector representation generator 506, a neural network 530, and an error correction model 540. During the training phase, the training category associations 502 and the training labels 504 may be input to the artificial intelligence model 500 to update and fine tune parameters of the neural network 530. In some embodiments, the training labels 504 of one set of training category associations 502 may correspond to a relevance value for a particular video title 104. For example, if the video content 110a corresponds to the "Highlights of Women's Singles Championship at Wimbledon between Serena Williams and Angelique Kerber", there may be several category associations 502 (e.g., "human", "female", "Serena Williams", "Angelique Kerber", "sport", "tennis", "tournament", "Wimbledon", "championship", etc.). Each training label 504 may correspond to a tuple, where the tuple contains a mapping between a given category association 502, a particular video title 104, and a relevance ranking value, which corresponds to the degree of relevance between the given category association and the particular video title 104. For example, the "human" category association may have only a 25% relevance ranking for this particular video content 302, whereas "Serena Williams" may have a 85% relevance ranking, and "Wimbledon" may have a 98% ranking. In some embodiments, the training labels may be used to train the model 500 to infer a relevance ranking between any suitable category and a particular video title 104. For example, this may include video titles 104 which are associated with categories that the service provider wants to exclude from being published (e.g., restricted copyright content, sexually explicit videos, etc.).

The training category associations 502 may be input to the vector representation generator 506. In one embodiment, the vector representation generator 506 may output a training vector category representation 508 which includes a list of the category associations 502 for a particular video content 110a.

The neural network 530 may be trained to infer an association between a vector category representation 508 and a video title 104. As mentioned above, each training label 504 may associate one set of training category associations 502 to a particular video title 104. In some embodiments, each category association 502 may have a relevance value assigned, pertaining to its relevance for a particular video title 104. However, in other embodiments, no such per-category relevance value is required. Instead, the category associations 502, grouped together, may be associated with a particular video title 104. Upon an analysis of a vector category representation 508, the neural network 530 may use the training label as ground truth.

In an example, the neural network 530 may be a feedforward neural network trained with a loss function 532. The loss function 532 may be defined based on an error of associating a vector category representation 508 with an incorrect video title 104, where the error may be based on the degree of inaccuracy. For example, the neural network 530 may correctly identify a category vector category representation 508 with a tennis match title, but may incorrectly identify it as a U.S. Open Tennis Championship instead of a Wimbledon Tennis Championship. In other example, the neural network 530 may incorrectly identify a category association vector representation 508 with a basketball tournament, which may be a higher degree of error than the first example. The loss function 532 may include an evaluation metric that may be adjusted based on the degree of error. For a larger degree of error, the penalty may be increased. Conversely, for a smaller degree of error, the penalty may be decreased.

The loss function 532 may also include an evaluation metric that can be adjusted based on feedback from the error correction model 540. As further described herein below, the error correction model 540 may correct associations between training vector and the video titles. The corrections may be fed back to the loss function 532 as a penalty.

The training of the neural network 530 may include iteratively minimizing the loss function 532 and updating parameters of the neural network 530 through backpropagation. The neural network 530 may infer video title associations 534. These outputted inferences may be provided as input to the error correction model 540 after each iteration, a number of iterations, or upon running the total number of iterations. A video title association 534 may correspond to a vector category representation 508 that, in turn, corresponds to a one or more category associations of a video content 110a.

The error correction model 540 may detect errors in the category associations 534 and may correct some or all of the errors. Different types of errors may be detected and/or corrected including actual and potential errors, depending on the error correction techniques and contexts around the errors. Various techniques may be used by the error correction model 540, including, but not limited to, pattern recognition, rules, and/or heuristics. In one example, training title labels 501 may be used to train the error correction model 540, which may correspond to video labels 104b of FIG. 1. The training title labels 501 may be used to generate heuristics, and may correspond to sample metadata that may be received by a catalog associate 102 when inputting a video title 104 into the video catalog 106. The heuristics may allow the error correction model 540 to correct video title associations 534. For example, a video title metadata 104b may include a specific day and time range for which a video file 110 is to be expected to be received. If the video title association 534 inference corresponds to a video file 110 that was received on a different day and outside the time range, the correction model 540 may return an error.

In an example, the error correction model 540 may output association corrections 538. An association correction 538 may indicate that a video title association 534 includes an error. The association correction may also include a correction to the video title association 534. Continuing from the previous example, if the model 540 determines that a particular video file 110 was received within the expected time range identified by the video title metadata 506, the model 540 may correct the association 538. The association corrections 538 may be provided as feedback to the neural network 530 to update the loss function 532.

Figure 6:
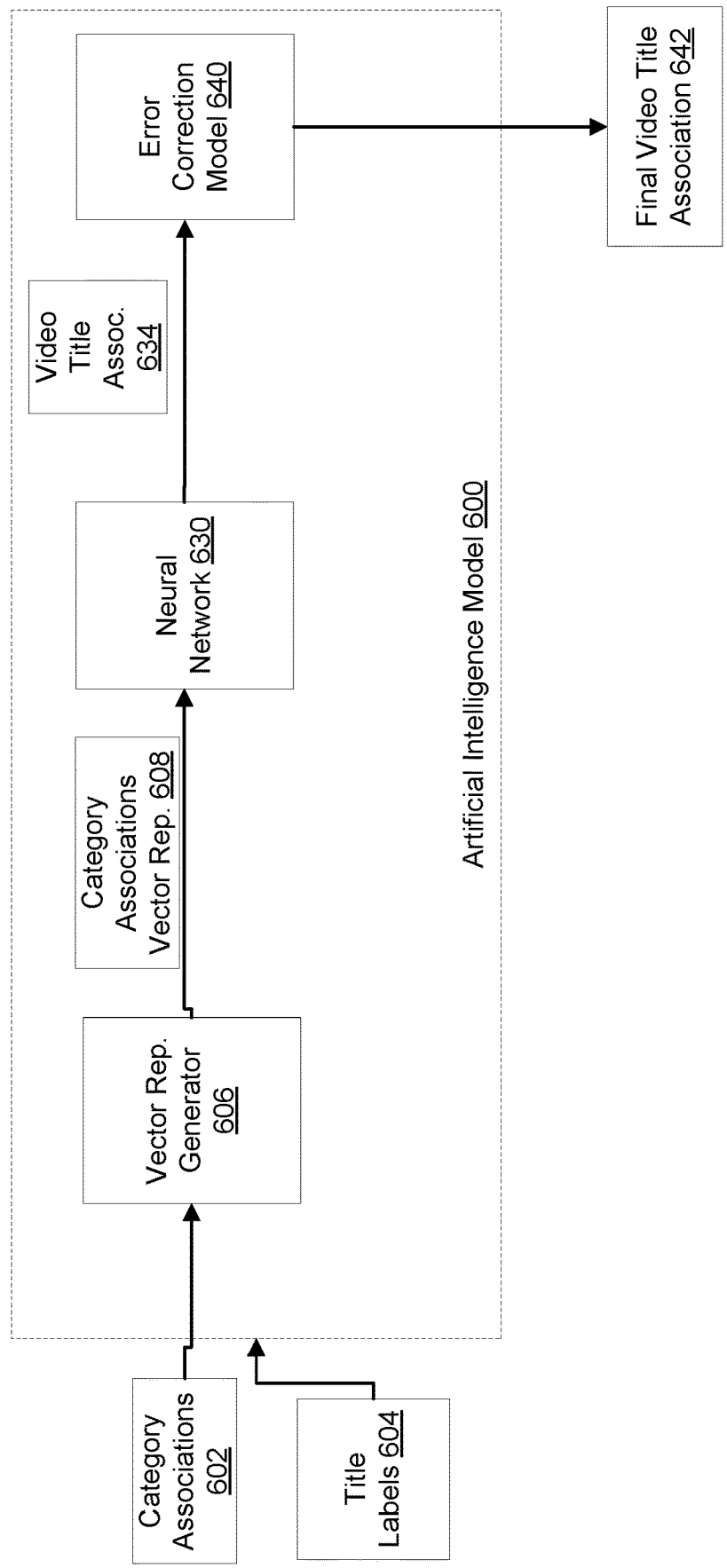
FIG. 6 illustrates an example computing environment for using a trained artificial intelligence model to infer relevance between video content and a video title, according to an embodiment of the present disclosure.

FIG. 6 illustrates an example computing environment for using an artificial intelligence model 600 to output inferences of video title associations corresponding to video content, according to an embodiment of the present disclosure. The artificial intelligence model 600 may correspond to a trained version of the artificial intelligence model 500 of FIG. 5. In particular, the artificial intelligence model 600 may include a vector representation generator 606 (that can be the same as the vector representation generator 506), a neural network 630 (that can be a trained version of the neural network 530), and an error correction model 640 (that can be the same as the error correction model 540).

In some embodiments, category associations 602 (which may correspond to final category associations 442 in FIG. 4 and category associations 122 inferred from the category association system 118 in FIG. 1) may be provided as an input to the vector representation generator 606. The vector representation generator 606 may output a vector category representation 608, which includes a list of the category associations 602 for a particular video content 110a. The vector category representation 608 may be input to the neural network 630. In some embodiments, title labels 604 (which may correspond to video labels 104b in FIG. 1) may also be input to artificial intelligence model 600, which may be used by the error correction model 640, as discussed below.

The neural network 630 may infer video title associations 634. In some embodiments, each video title association 634 may include a tuple, each tuple corresponding to a candidate video title, and containing at least an identifying key of the video title and a probability value (also may be known as a "relevance score") that corresponds to the likelihood that the particular video title is an accurate match. In some embodiments, the video title associations 634 may be input to the error correction model 640. Alternatively, or in addition, relevance scores may differ from probability values, for example, the relevance scores may be calculated utilizing any suitable relevance algorithm.

The error correction model 640 may infer final video title associations 642. In an example, the error correction model 640 may use heuristics to detect and correct errors in the video title associations 634. One heuristic may be based on the length of the content that is expected, which may be identified in a title label 604. If the video title association 634 is significantly different than the length of content expected, the error correction model 640 may return an error and/or correct the output. Accordingly, the video title associations 634 may be updated, resulting in the final video title associations 642 (which may correspond to the video title associations 125 of FIG. 1), some of which may be uncorrected category associations and other ones may be corrected category associations. A video title association system 124 may store the final one or more video title associations 642 in the staging video vault 114 of FIG. 1.

In some embodiments, and as discussed further below, depending on the degree of confidence in the video title association 642, the video title association system 124 may prompt the video file 110, associated with the video title 104, to be posted from the staging video vault 114 to the production video vault 128.

Figure 7:
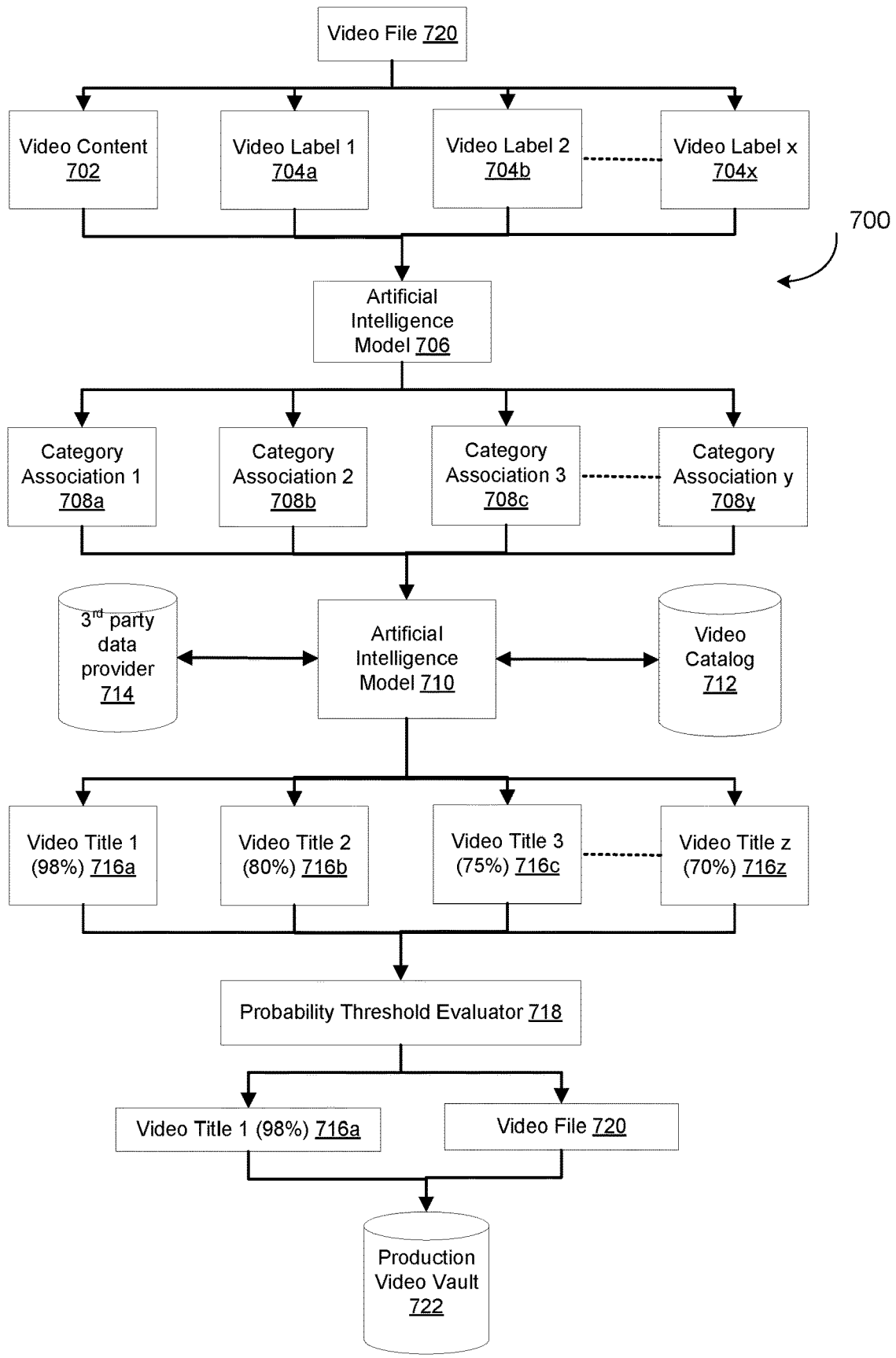
FIG. 7 illustrates an example flow for using an artificial intelligence model to associate video content with a video title, according to an embodiment of the present disclosure.

FIG. 7 illustrates an example data flow 700 of a computer system for using a trained artificial intelligence model to associate video content with a video title, according to an embodiment of the present disclosure. Although in the flow 700, two artificial intelligence models 706, 710 are described, this is for illustration purposely only. In some embodiments, there may be more than two artificial intelligence models used to perform the methods disclosed. In some embodiments, there may be only one artificial intelligence model used to perform the methods disclosed.

In some embodiments, a video file 720 (which may correspond to video file 110 of FIG. 1) may be received by a computer system (e.g., video reception system 112 of FIG. 1). The video file 720 may include a video content 702 (which may be the same as video content 110a of FIG. 1), and zero or more video labels 704a-x (which may be the same as video labels 110b of FIG. 1). As described above, the video content 702 may contain a plurality of frames. The video content 702 may also contain metadata that is associated and/or interspersed within the plurality of frames. The video labels 704a-x may be one or more metadata elements that correspond to the video content 702. They may be elements that a user manually inputs into a computing device via a user interface, as shown in FIG. 2 (e.g., SKU, Content Type, Video Provider Name, etc.). As described above, the metadata elements may alternatively be added by a user by directly modifying the filename via an operating system command. The elements may vary depending on the type of content. Also, as noted above, sometimes a provider may not input any labels, and/or some of the labels may have errors (e.g., substantive or other).

In some embodiments, the video content 702 and the zero or more video labels 704a-x may be received by an artificial intelligence model 706, which may correspond to trained artificial intelligence model 400 of FIG. 4 and/or a trained artificial intelligence model 120 of FIG. 1. The model may analyze the video content 702 and video labels 704a-x, and may infer one or more category associations 122a-y. In some embodiments, there may be one or more category associations 708a-y (which may correspond to final category associations of FIG. 4 and/or category associations 122 of FIG. 1) associated per frame of the video content 702. In other embodiments, there may be one or more category associations 708a-n associated with the video content 702 as a whole. These associations 708a-y may be formatted in any suitable manner.

The category associations 708a-y may be then received by an artificial intelligence model 710 (which may correspond to a trained artificial intelligence model 126 of FIG. 1 and/or trained artificial intelligence model 600 of FIG. 6). The model 710 may be a separate model from model 706, or may be part of a singular model. In some embodiments, the artificial intelligence model 710 may be trained to infer one or more candidate video titles 716a-z, each of which may be associated with the video content 702 with some probability, based on the category associations 708a-y received from the earlier model 706. In some embodiments, the model 710 may have been trained to infer category associations 708a-y with video titles 716a-z based in part on training data received by a video catalog 712 (which may correspond to video catalog 106 of FIG. 1). The model 710 may also have been trained based in part on training data received from a third party provider 714 (which may correspond to third party data provider 130 of FIG. 1), directly or indirectly (e.g., via the video catalog 712, which receives data from the third party provider 714). The number of video labels 704a-x, the number of category associations 708a-y, and the number of video title associations 716a-z may be any suitable number and need not be the same.

In some embodiments, the trained artificial intelligence model 710 may infer a plurality of video title candidates 716a-z, each with a corresponding probability (i.e. "relevance score") of matching the video content 702. A probability threshold evaluator module 718 of the computer system may determine which, if any, of the video title candidates 716a-z meet a threshold requirement. The category associations 708a-y may be correlated together by the model 710 to assess the probability of a valid match. The threshold requirement may correspond to a threshold value, which may be a minimum level of confidence to confirm a valid match. In some embodiments, this threshold requirement may be set to at least 95%, to reduce the risk of creating a false match. In other words, a service provider may prioritize having a valid match with high probability (i.e. reduce the risk of false positive) over the risk of passing over valid matches (i.e. increased risk of false negative). In some embodiments, there could be multiple candidates that pass the threshold. In such case, the threshold evaluator module 718 may choose the candidate with the highest confidence. In other embodiments, the threshold evaluator module 718 may flag the candidates for requiring further evaluation by a human (once a candidate is selected, it may be used to further train the model 710 for future reinforcement learning). In yet other embodiments, for example, if the threshold value was set to 80%, the threshold evaluator may determine that the video content 702 matches multiple video titles (e.g., Video Title 1, 98% confidence 716a and Video Title 2, 80% confidence 716b) and that each match should be published.

In some embodiments, there may be no candidates that pass the threshold evaluator module 718. In this case, as discussed above, the system may determine that a human (e.g., catalog associate 102) needs to evaluate what steps should be taken. In other cases in which no candidates that pass the threshold evaluator module 718, the computer system may determine to create a new catalog title based on one or more sources. For example, the computer system could download data from a third-party data provider, and use heuristics to match the category associations 708a-y with one of the titles downloaded from a third party. In another example, the computer system could use the category associations 708a-y to create a new video title or update an existing video title, based on one or more of the category associations 708a-y and the video labels 704a-x associated with the video content. For example, the artificial intelligence model may determine that "Novak Djokovic", "Kevin Anderson", and "Wimbledon" are categories of a particular video content. The particular video content may also have a video label of "Tennis Championship Highlights." In one embodiment, the computer system could use heuristics to determine to create a new video title called "Wimbledon Championship Highlights—Novak Djokovic v. Kevin Anderson." In yet another example, the video catalog may initially contain a video title template entry called "2018 Wimbeldon Men's Singles—X v. Y Highlights." A video title template (also may be called a "catalog entry template") may have certain portions of the template completed, but other portions are yet to be filled in. That is, the template may have parameters that may take on values. In the example above, the "X v. Y" (the template parameters) may not have actual players' names (the parameter values) because the players have not yet been determined, and the title is just a placeholder. The computer system, upon receiving category associations of "Wimbledon", "Kevin Anderson", and "Novak Djokovic", and based in part on the date and time the video was received, may update the title entry by correcting the "Wimbeldon" misspelling and replacing "X v. Y" with the players' names (e.g., "2018 Wimbledon Men's Singles—Novak Djokovic v. Kevin Anderson Highlights"). Particular types of template parameters may be populated with values from corresponding types of category association. For example, types of template parameters may include types of catalog entries and/or types of metadata. In other embodiments, the computer system may create a new catalog title entry with the populated template and corrected spelling. It should be understood that just as video titles of existing catalog entries can be ranked and a best match selected, video title templates can also be ranked. Accordingly, a video title template may be selected as a video match based on the one or more inferences of the second artificial intelligence model, and a video title may be generated based on the template. Thereby, the computer system as described above at least in part enables access to the video content 702 by a user (e.g., in the example above, "2018 Wimbledon Men's Singles—Novak Djokovic v. Kevin Anderson Highlights"), so a customer of the service provider may search for and access the content from their consumer device 138.

Once the threshold evaluator 718 determines a valid match, it may generate an association between the pair (the association of a valid match may also be called a "video match"), the pair comprising the selected video title 716a (e.g., if the threshold value was set to 95%, then Video Title 1, 98% confidence 716a is selected) and the video content 702 of the video file 720. The computer system may then cause the pair to be published to a production video vault 722 (which may correspond to production video vault 128 of FIG. 1). Thereby, the computer system as described above at least in part enables access to the video content 702 by a user, so a customer of the service provider may search for and access the content from their consumer device 138.

Figure 8:
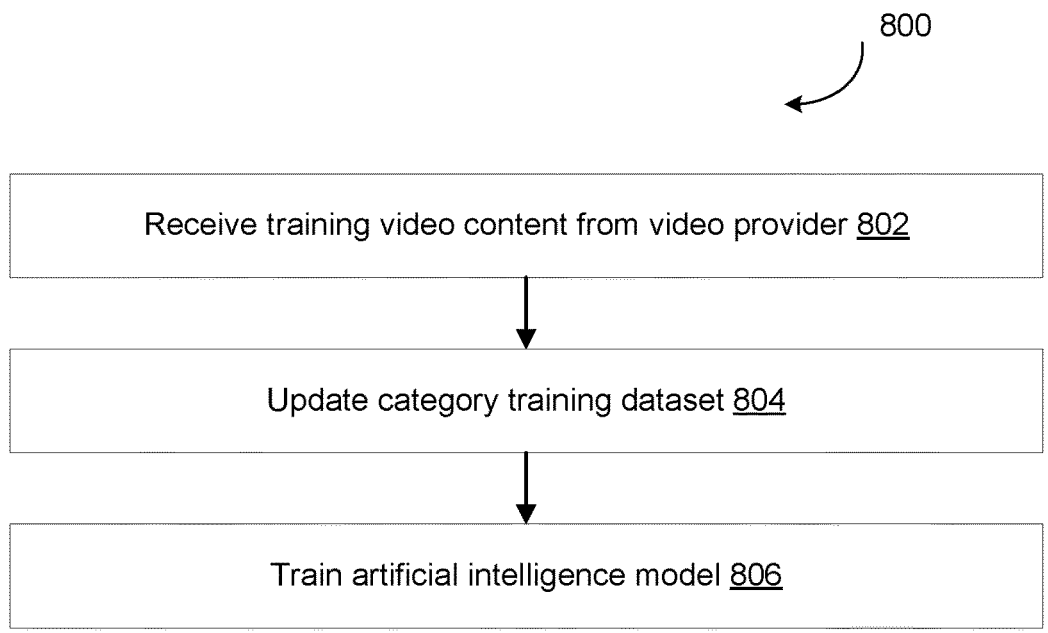
FIG. 8 illustrates an example flow for training an artificial intelligence model, according to an embodiment of the present disclosure.

FIG. 8 illustrates an example flow for training an artificial intelligence model (which may correspond to artificial intelligence model 120 of FIG. 1 and/or artificial intelligence model 300 of FIG. 3), according to an embodiment of the present disclosure. The example flow may start at operation 802, where a computer system may receive one or more training video files containing training video content from a video provider. In some embodiments, the training video content may be a highlight video from a sports match, a news highlights video, a movie, an episode of a television series, or any other suitable video content. The training video content does not necessarily need to be of the same genre as the video content 110a that the trained artificial intelligence model (see FIG. 10 below) will generate inferences from, to later match against a video title 104. However, the training video content should be of a type that allows the artificial intelligence model to be trained to infer suitable category associations from video frames. For example, the service provider may want to train the model 300 to recognize Serena Williams' face, which may later be used to recognize Williams' face in a highlights video from a future tennis championship match (e.g. Wimbledon). The service provider may receive training video content from a variety of sources (e.g., news video clips, tennis match broadcasts recorded from live television, etc.) to be used to train the model 300, provided that each video content contains suitable training samples to recognize Williams' face.

At operation 804, having received the training video content, the computer system may update the category training dataset, which may correspond to category training dataset 116. In some embodiments, the system may store the training video content in a video vault (which could be the same staging video vault 114 that later receives video file 110 to be matched against video title 104). In this case, a portion of the video content of the video vault 114 may be retrieved and set aside as training dataset content 116. In other embodiments, the training video content may be stored in a separate data store that contains the category training dataset. As described above, the training dataset 116 may also include training labels that identify video frames from the training video content, and identify the corresponding categories associated with each frame (e.g. Frame x contains "Serena Williams' face"). Such training labels can be used as the ground truth. The training dataset may also include a large and diverse set of training video contents of different lengths, genres, and types.

At operation 806, the computer system may train the artificial intelligence model to infer categories from portions of video content. In an example, the training dataset from operation 804 may be an input to the artificial intelligence model, and the model may be trained in a manner similar to that described in FIG. 3.

Figure 9:
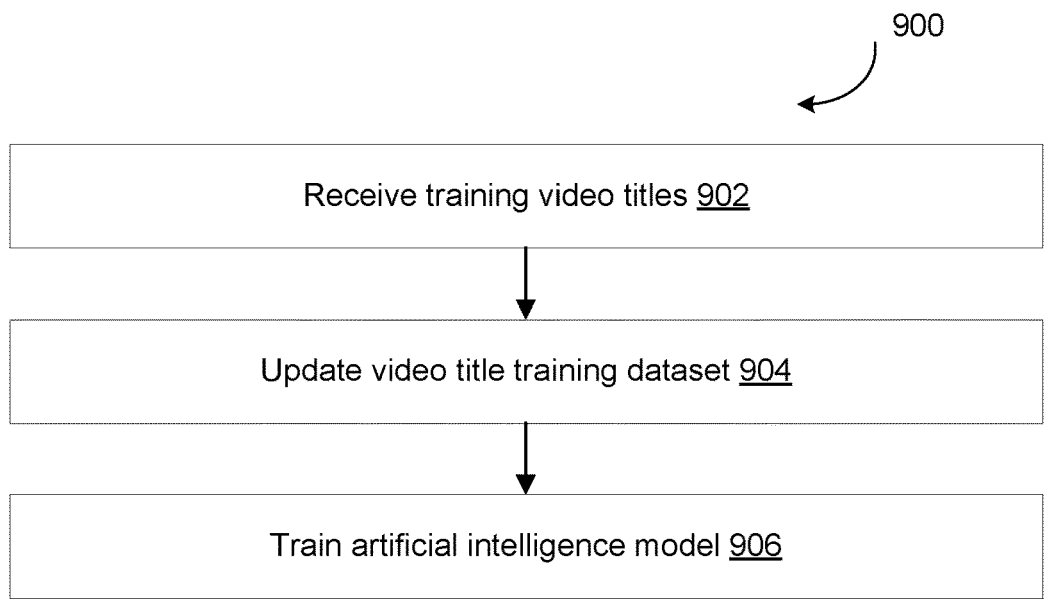
FIG. 9 illustrates another example flow for training an artificial intelligence model, according to an embodiment of the present disclosure.

FIG. 9 illustrates an example flow for training an artificial intelligence model (which may correspond to artificial intelligence model 126 of FIG. 1 and/or artificial intelligence model 500 of FIG. 5), according to an embodiment of the present disclosure. The example flow may start at operation 902, where a computer system may receive one or more training video titles. In some embodiments, the training video titles may be received from a service provider associate 102. The training video titles may also be provided by a third party data provider, or any other suitable source. In some embodiments, the training video titles may be titles corresponding to a highlight video from a sports match (e.g., "Pittsburgh Steelers vs. Houston Texans Highlights—Dec. 25, 2017"), a news highlights video (e.g., "President Trump Inauguration 2017 Highlights", a movie title (e.g., "Star Wars: Episode IX"), the title of an episode of a television series (e.g., "The Handmaid's Tale—Episode 1: Offred"), etc. The training video titles do not necessarily need to be of the same genre as the video content 110a that the trained artificial intelligence model (see FIG. 10 below) will generate video title inferences from. However, the training video titles should be of a type that allows the artificial intelligence model to be trained to infer suitable video title associations from category associations. For example, continuing from a previous example, if the model is being trained to infer a tennis match and the corresponding players, there may be several candidate training video titles (e.g., "2018 Wimbledon Championships—Women's Singles Highlights—X v. Y", "2018 Wimbledon Championships—Men's Singles Highlights—X v. Y", etc.).

At operation 904, having received the training video titles, the computer system may update the video title training dataset, which may correspond to video title training dataset 131. In some embodiments, the system may store the training video titles in a video catalog (which could be the same video catalog 106 that later receives video title 104 to be matched against video file 110). In this case, a portion of the video titles of the video catalog 106 may be retrieved and set aside as training dataset content 131. In other embodiments, the training video title dataset may be stored in a separate data store. As described above, the training dataset 131 may also include training labels (e.g., which may correspond to training labels 504) that may be input to the artificial intelligence model. As described above, in one embodiment, each training label 504 may correspond to a tuple, where the tuple contains a mapping between a given category association, a particular training video title of the training dataset 131, and a relevance ranking value, which corresponds to the degree of relevance between the given category association and the particular video title.

At operation 906, the computer system may train the artificial intelligence model to infer one or more video title associations (e.g., which may correspond to video title associations 534 in FIG. 5) from a list of category associations. In an example, the training dataset from operation 804 may be an input to the artificial intelligence model, and the model may be trained in a manner similar to that described in FIG. 5.

Figure 10:
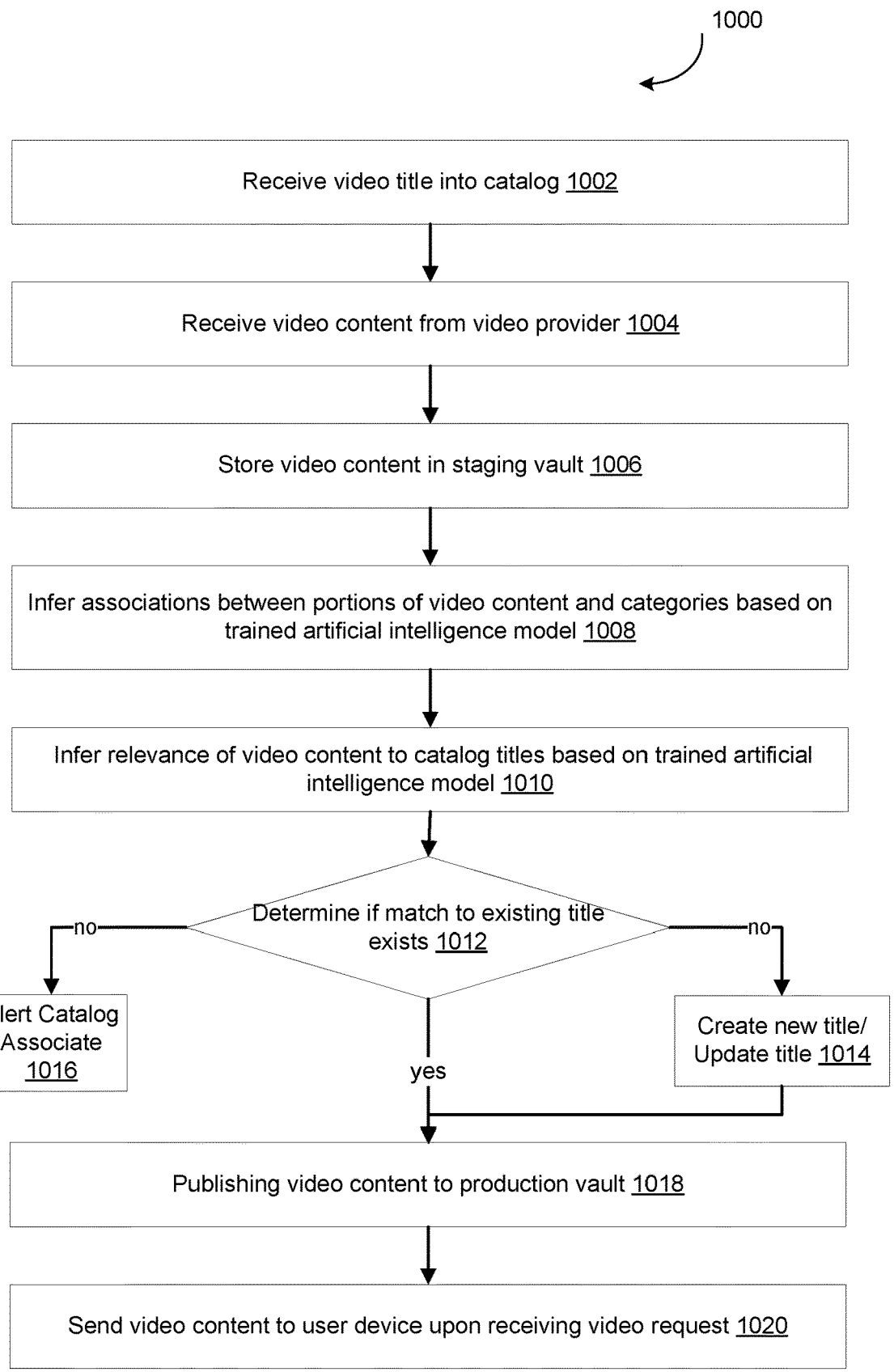
FIG. 10 illustrates an example flow for providing a multimedia service based on an artificial intelligence model, according to an embodiment of the present disclosure.

FIG. 10 illustrates an example flow for providing a multimedia service based on a trained artificial intelligence model, according to an embodiment of the present disclosure. Some or all of the process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The artificial intelligence model may be componentized into sub-models, communicably connected as described in FIG. 7. The artificial intelligence model of operation 1004 may be similar to a trained artificial intelligence model 120 of FIG. 1 and model 400 of FIG. 4, the result of the training process described in FIG. 3 and FIG. 8. The artificial intelligence model 1010 may be similar to a trained artificial intelligence model 126 of FIG. 1 and model 600 of FIG. 6, the result of the training process described in FIG. 5 and FIG. 9. Additionally, although only one computer system is described in the method flow below, one or more computer systems may be involved in performing the method described below.

The example flow may start at operation 1002, where a computer system may receive a video title 104 from a catalog associate 102 to be input into a video catalog 106, which contains a list of video titles. The video title 104 may initially be a placeholder, to be later associated (and possibly updated) with video content 110a from a video file 110.

At operation 1004, the computer system may receive video content 110a from a video provider 108. In an example, the video content may be a video file 110, such as a highlight video from a sports match, a news highlights video, a movie, or an episode of a television series.

At operation 1006, the computer system may store the video content in a staging video vault 114. In some embodiments, the video file 110 may not be stored in a permanent storage (e.g., disk-based storage), but rather may be temporarily held in volatile memory (RAM-based memory). In some embodiments, the video content may be in the form of a live stream, which case the video vault may serve as a conduit for hosting the streaming service, and provide temporary storage and stream buffering functions.

At operation 1008, the computer system may retrieve the video content 110a from the staging video vault 114. The video content 110a may be retrieved as part of an automatic process upon receiving new video content 110a, or manually, for example, by an associate of the service provider. The video content 110a may be input into a trained artificial intelligence model of the computer system, which may infer category associations 122 between portions of the video content 110a and categories corresponding to features of the video content. In an example, the artificial intelligence model may infer associations 122 between vector representations of frames or the frames themselves and the categories. The computer system may store these as key-value pairs. Further, the computer system may identify each portion of the video content and the association to one or more categories. The resulting identifications may be stored as association information 122. In some embodiments, the category associations 122 may not require storage, and may instead be immediately further processed by the computer system.

At operation 1010, the computer system may retrieve the category association information 122 that was generated in operation 1008. This retrieval may happen as part of an automatic process, with the computer system being prompted after the category associations 122 have been produced. The computer system may generate a match between the particular video content received in operation 1004 and the video title received in operation 1002 based on a trained artificial intelligence model (which may correspond to the trained model 600 of FIG. 6). In an example, the computer system may input the category association information 122 to the artificial intelligence model. In response, the artificial intelligence model may infer one or more candidate matches between the video content (e.g., represented by a vector representation of categories associated with the video content) and one or more video titles of the video catalog. In some embodiments, the artificial intelligence model may, upon inferring a candidate match, also infer a probability that the candidate match is a valid match.

At operation 1010, the computer system may analyze and determine which candidate match is most likely a valid match based, at least in part, on the one or more probabilities inferred by the trained artificial intelligence model. In some embodiments, the computer system may determine which match is a valid match, based in part on a threshold value, the threshold value corresponding to a minimum level of confidence needed to confirm a valid match. In some embodiments, the computer system may also use other metadata (e.g., correlating video labels 104b from the video title 104 with metadata associated with the video file 110) to help determine if a valid match exists (e.g., time ranges of when the video was expected to be received, range of length of the expected video, etc.).

At operation 1014, the computer system may determine that there is no exact match to an existing title, and/or that a catalog title entry needs to be updated. For example, the system may determine that the video content 110a matches a video title template 104 (e.g., "2018 Wimbeldon Men's Singles—X v. Y Highlights"), and that the players "X" and "Y" need to be updated with actual players' names that were detected by the artificial intelligence model. The system may create a new file or update the existing template by replacing the placeholder names. In another embodiment, the system may update a video title 104 (e.g., updating the video name 104a and/or one or more of the video labels 104b) if the system determines that there was a human input error when originally creating the video title 104 (e.g., correcting "Wimbeldon" to be "Wimbledon").

At operation 1016, the computer system may determine that there is no exact match to an existing title, template, or any other catalog title entry that should be updated. In this case, the system may alert a catalog associate that no match could be found for a given video file 110. The associate may instruct the system to contact a third party data source to obtain more video titles to search against. In some embodiments, the artificial intelligence model may need to be further trained to infer category associations with the new video titles.

At operation 1018, the computer system, after determining that a valid match exists (either at operation 1012, or after creating and/or updating a video title at operation 1014), may generate an association (i.e. a "video match") between the matching video title 104 of the video catalog 106 and the matching video file 110, and may cause the pair to be published together to a data store, which may curate the data contents associated with the video match for customer access (e.g., this may be similar to the production video vault 128 of FIG. 1). Therefore, this example flow at least in part enables access to a video content by a video catalog user, by enabling the user to search for a video title and retrieve the corresponding video content. In some embodiments, the production video vault 128 may receive the contents from one or more data stores (e.g., the staging video vault 114, the video catalog 106).

At operation 1020, a user may use their user device 138 to search for a particular video content (e.g., "Wimbledon Women's Singles Highlights"), and send a request to a video server system (e.g., video server system 132 of FIG. 1) of the multimedia service provider. Upon receiving a request from the user device 138, the server may look for a matching video title in the production video vault 128 (or similar data store), and then send the video content to the user device. The content may be downloaded via any suitable method (e.g., live streaming, file download).

Figure 11:
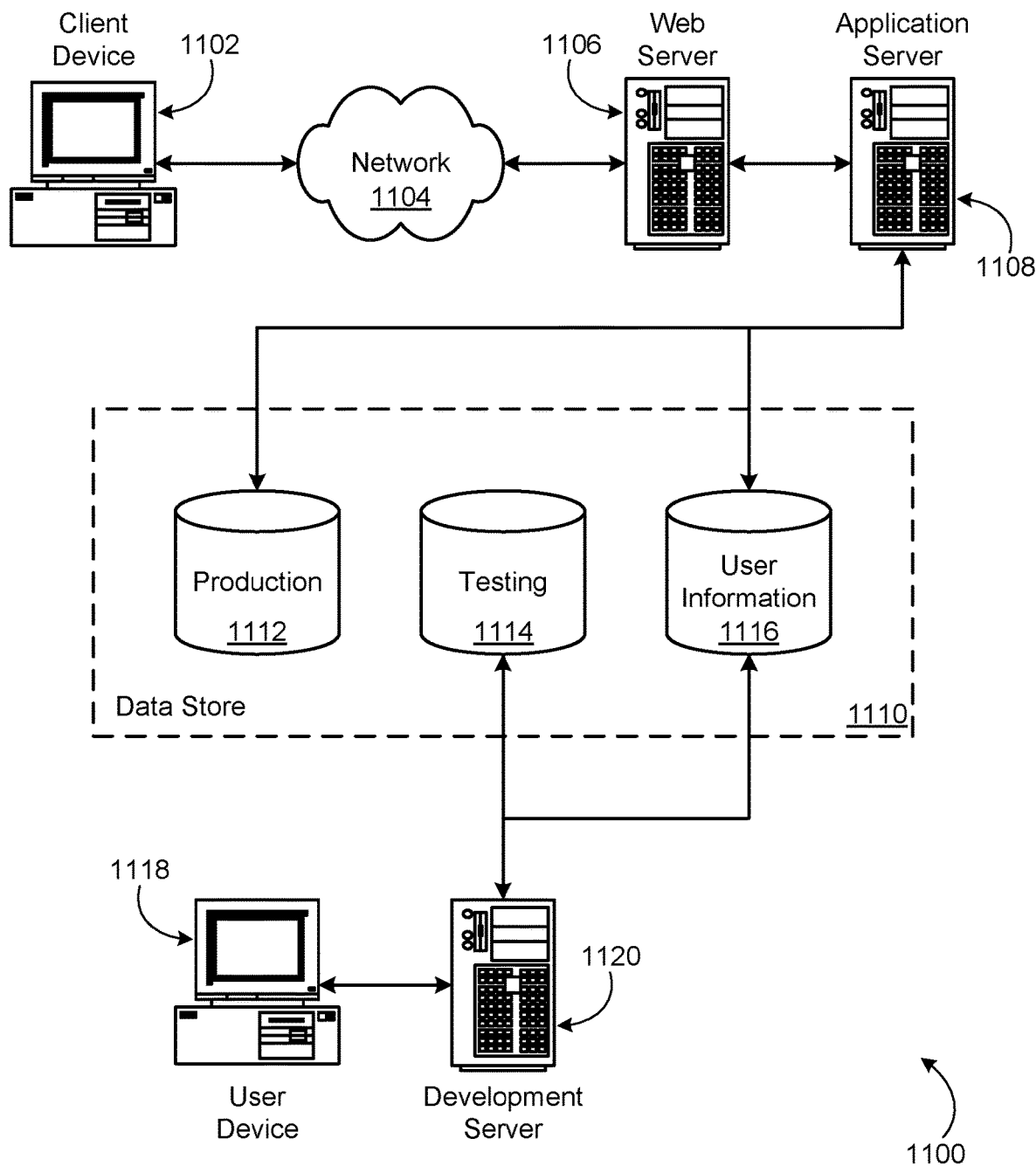
FIG. 11 is a schematic diagram illustrating an example environment for implementing aspects in accordance with at least one embodiment.

Various approaches to the method and system described above may be implemented in various environments for various applications. For example, FIG. 11 illustrates aspects of an example environment 1100 for implementing aspects in accordance with various embodiments. As will be appreciated, although a Web-based environment may be utilized for purposes of explanation, different environments may be utilized, as appropriate, to implement various embodiments. The environment 1100 shown includes both a testing or a development portion (or side) and a production portion. The production portion includes an electronic client device 1102, which may include any appropriate device operable to send and receive requests, messages, or information over an appropriate network 1104 and convey information back to a user of the device 1102. Examples of such client devices include personal computers, cell phones, handheld messaging devices, laptop computers, tablet computers, set-top boxes, personal data assistants, electronic book readers, and the like.

The network 1104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 1104 includes the Internet, as the environment includes a Web server 1106 for receiving requests and serving content in response thereto, although for other networks an alternative device serving a similar purpose could be utilized as would be apparent to one of ordinary skill in the art.

The illustrative environment 1100 includes at least one application server 1108 and a data store 1110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 1108 may include any appropriate hardware and software for integrating with the data store as needed to execute aspects of one or more applications for the client device 1102, and may even handle a majority of the data access and business logic for an application. The application server 1108 provides access control services in cooperation with the data store 1110, and is able to generate content such as text, graphics, audio, and/or video to be transferred to the user, which may be served to the user by the Web server 1106 in the form of HTML, XML, or another appropriate structured language in this example.

The handling of requests and responses, as well as the delivery of content between the client device 1102 and the application server 1108, may be handled by the Web server 1106. It should be understood that the Web and application servers 1106, 1108 are not required and are merely example components, as structured code discussed herein may be executed on any appropriate device or host machine as discussed elsewhere herein. Further, the environment 1100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 1100 may also include a development and/or testing side, which includes a user device 1118 allowing a user such as a developer, data administrator, or tester to access the system. The user device 1118 may be any appropriate device or machine, such as is described above with respect to the client device 1102. The environment 1100 may also include a development server 1120, which functions similar to the application server 1108 but typically runs code during development and testing before the code is deployed and executed on the production side and becomes accessible to outside users, for example. In some embodiments, an application server may function as a development server, and separate production and testing storage may not be utilized.

The data store 1110 may include several separate data tables, databases, or other data storage mechanisms and media for storing data relating to a particular aspect. For example, the data store 1110 illustrated includes mechanisms for storing production data 1112 and user information 1116, which may be utilized to serve content for the production side. The data store 1110 also is shown to include a mechanism for storing testing data 1114, which may be utilized with the user information for the testing side. It should be understood that there may be many other aspects that are stored in the data store 1110, such as for page image information and access right information, which may be stored in any of the above listed mechanisms as appropriate or in additional mechanisms in the data store 1110.

The data store 1110 is operable, through logic associated therewith, to receive instructions from the application server 1108 or development server 1120, and obtain, update, or otherwise process data in response thereto. In one example, a user might submit a search request for a certain type of item. In this case, the data store 1110 might access the user information 1116 to verify the identity of the user, and may access the catalog detail information to obtain information about items of that type. The information then may be returned to the user, such as in a results listing on a Web page that the user is able to view via a browser on the user device 1102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 1100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self-organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for matching video content with a video title, comprising:
   receiving a highlight video title into a video catalog, the highlight video title comprising one or more labels associated with a particular highlight video content that is scheduled to be received at a later time, the video catalog comprising a plurality of video titles, and the highlight video title being initially unmatched with the particular highlight video content at a time of receiving the highlight video title;
   receiving the particular highlight video content at the later time, the particular highlight video content comprising a plurality of frames and one or more labels associated with the particular highlight video content;
   inputting, to a first reinforcement learning model, a sequence of vector frame representations corresponding to frames from the plurality of frames of the particular highlight video content, the first reinforcement learning model configured to associate a frame with one or more categories based at least in part on an error of associating the frame with an incorrect category;
   receiving, based at least in part on the first reinforcement learning model, one or more category associations between the vector frame representations from the sequence and the one or more categories, each category association being associated with the particular highlight video content;
   inputting, to a second reinforcement learning model, a vector category representation corresponding to the one or more category associations received based at least in part on the first reinforcement learning model, the second reinforcement learning model configured to associate the one or more category associations with the highlight video title of the video catalog, based at least in part on an error of associating the one or more category associations with an incorrect video title;
   receiving, based at least in part on the second reinforcement learning model, one or more video title associations between the vector category representation and one or more video titles of the plurality of video titles of the video catalog; and
   generating, based at least in part on the one or more video title associations, a highlight video match between the highlight video title and the particular highlight video content thereby at least in part enabling access to the particular highlight video content by a video catalog user.

2. A computer-implemented method according to claim 1, wherein the one or more video title associations each comprises a probability value, the probability value indicating a probability that a video title of the one or more video title associations is the highlight video title.

3. A computer-implemented method according to claim 2, wherein the highlight video match is generated based on a threshold value, the highlight video match being generated if the probability value equals or exceeds the threshold value.

4. A computer-implemented method according to claim 3, wherein the highlight video match generation comprises a first generation and a second generation, the first generation comprising determining that none of the probability values of the video title associations equals or exceeds the threshold value, and the second generation comprising:
   receiving, by the video catalog from a third-party data provider, one or more video titles; and
   training the second reinforcement learning model to associate the one or more category associations with the highlight video title of the video catalog.

5. A computer-implemented method according to claim 2, wherein at least one label of the highlight video title corresponds to an expected time range, and at least one label of the particular highlight video content corresponds to a timestamp, the timestamp corresponding to a time the particular highlight video content was received; and further comprising:
   generating the probability value at least by determining if the timestamp of the particular highlight video content matches the expected time range.

6. A computer-implemented method according to claim 1, further comprising:
   selecting the frames based at least in part on a sampling of the video content according to a frame rate; and
   inputting a sequence of the frames to a third reinforcement learning model, wherein the sequence of vector frame representations is received from the third reinforcement learning model based at least in part on the sequence of the frames.

7. A computer-implemented method according to claim 1, wherein at least one of the category associations comprises an association between a particular human face and at least one of the vector frame representations.

8. A computer-implemented method according to claim 1, wherein the highlight video match further comprises updating the one or more labels of the highlight video title.

9. One or more non-transitory computer-readable media having collectively thereon computer-executable instructions that configure one or more computers to collectively, at least:
input, to a first artificial intelligence model, a sequence of representations corresponding to frames of a particular video content, the first artificial intelligence model configured to generate an association between the particular video content and one or more categories;
input, to a second artificial intelligence model, a representation of the one or more category associations generated by the first artificial intelligence model, the second artificial intelligence model configured to associate the representation of the one or more category associations with portions of one or more catalog entries of a video catalog comprising a plurality of video titles;
determine, based on output of the second artificial intelligence model, a relevance score for each of the one or more catalog entries that are initially unmatched to the particular video content; and
select a best match as corresponding to the catalog entry which has the highest relevance score thereby at least in part enabling access to the particular video content by a user.

10. One or more non-transitory computer-readable media according to claim 9, wherein the first artificial intelligence model and the second artificial intelligence model are communicably connected within a single artificial intelligence model.

11. One or more non-transitory computer-readable media according to claim 9, wherein the particular video content corresponds to a highlight video and the catalog entry comprises a video title.

12. One or more non-transitory computer-readable media according to claim 11, wherein the best match is selected based on a threshold value, the best match being selected if the relevance score equals or exceeds the threshold value.

13. One or more non-transitory computer-readable media according to claim 12, wherein the best match selection comprises a first part and a second part, the first part comprising determining that none of the relevance scores equals or exceeds the threshold value, and the second part comprising:
receiving, from a third-party data provider, video content, the video content comprising a plurality of frames and one or more labels associated with each frame; and
training, utilizing the video content, the first artificial intelligence model to associate the one or more frames of the plurality of frames with the one or more labels associated with each frame.

14. One or more non-transitory computer-readable media according to claim 13, wherein the first artificial intelligence model is trained to associate a frame with a particular sport, identities of one or more participants of the sport, a location corresponding to where the sport was played, or an event corresponding to a specific event represented by the frame.

15. One or more non-transitory computer-readable media according to claim 14, wherein the second artificial intelligence model is trained to associate one or more of a particular sport, one or more participants of the sport, a location corresponding to where the sport was played, and an event corresponding to a specific event represented by one or more of the representations, with a particular highlight video title.

16. One or more non-transitory computer-readable media according to claim 12, wherein the best match selection comprises a first part and a second part, the first part comprising determining that none of the relevance scores equals or exceeds the threshold value, and the second part comprising:
receiving, from a third-party data provider, video titles; each video title comprising one or more labels, and each label associated with a video content; and
training, utilizing the video titles, the second artificial intelligence model to associate the one or more labels of the video titles with the video content.

17. A computer-implemented system for matching video content with a video title, comprising:
one or more processors; and
one or more computer-readable storage media storing instructions that, upon execution with the one or more processors, cause the computer-implemented system to, at least:
input, to a first artificial intelligence model, a sequence of representations corresponding to frames of a particular video content, the first artificial intelligence model configured to generate an association between the particular video content and one or more categories;
input, to a second artificial intelligence model, a representation of the one or more category associations generated by the first artificial intelligence model, the second artificial intelligence model configured to associate the representation of the one or more category associations with one or more catalog entry templates of a video catalog;
determine, based on output of the second artificial intelligence model, a relevance score for each of the one or more catalog entry templates that are initially unmatched with the particular video content;
select a best match as corresponding to the catalog entry which has the highest relevance score; and
generate a new catalog entry based at least on the best match and the one or more categories output by the first artificial intelligence model, thereby at least in part enabling access to the particular video content by a user.

18. The computer-implemented system of claim 17, wherein the first artificial intelligence model and the second artificial intelligence model are communicably connected within a single artificial intelligence model and at least one of the first or second models is a neural network.

19. The computer-implemented system of claim 17, wherein the particular video content corresponds to a highlight video and the catalog entry comprises a video title.

20. The computer-implemented system of claim 19, wherein the best match is selected based on a threshold value, the best match being selected if the relevance score equals or exceeds the threshold value.

* * * * *